United States Patent [19]

Jeschke et al.

[11] 4,321,869
[45] Mar. 30, 1982

[54] DEVICE FOR DRIVING OR SYNCHRONIZING CYLINDERS IN OFFSET PRINTING PRESSES

[75] Inventors: Willi Jeschke, Heidelberg; Hugo Rambausek, Wiesloch; Paul Schilling, Neckargemünd, all of Fed. Rep. of Germany

[73] Assignee: Heidelberger Druckmaschinen Aktiengesellschaft, Heidelberg, Fed. Rep. of Germany

[21] Appl. No.: 53,802

[22] Filed: Jul. 2, 1979

[30] Foreign Application Priority Data

Jul. 1, 1978 [DE] Fed. Rep. of Germany ....... 2829026

[51] Int. Cl.³ .................. B41F 13/14; B41F 7/06; B41F 7/10
[52] U.S. Cl. .................. 101/136; 101/142; 101/183; 101/248; 474/900
[58] Field of Search ............ 101/248, 180, 181, 183, 101/184, 216, 217, 136–142; 74/395, 400, 401, 406, 409, 411, 412 R, 421 R, 440, 461, 458; 474/900

[56] References Cited

U.S. PATENT DOCUMENTS 2,948,216 8/1960 Thompson .................. 101/248
3,472,092 10/1969 Doolittle et al. .................. 74/440

FOREIGN PATENT DOCUMENTS 1805911 5/1969 Fed. Rep. of Germany .
2023510 2/1972 Fed. Rep. of Germany .
1069748 7/1954 France .
386793 4/1965 Switzerland .
1209959 10/1970 United Kingdom .

*Primary Examiner*—J. Reed Fisher
*Attorney, Agent, or Firm*—Herbert L. Lerner

[57] ABSTRACT

Drive for cylinders of an offset printing machine having a gear train constructed of spur gears disposed as drive gears on respective shafts of the cylinders, and including clamping devices for synchronizing rotation of the cylinders, the clamping devices being rotatable with the spur gears respectively associated therewith and having respective gear rims deformable more or less in accordance with an adjustment thereof, including a clamping plate respectively disposed coaxially to the spur gears, the spur gears being helically toothed, and at least two of the clamping devices mounted on the clamping plates, respectively, and acting in radial direction upon the gear rim of the spur gear respectively associated therewith.

4 Claims, 16 Drawing Figures

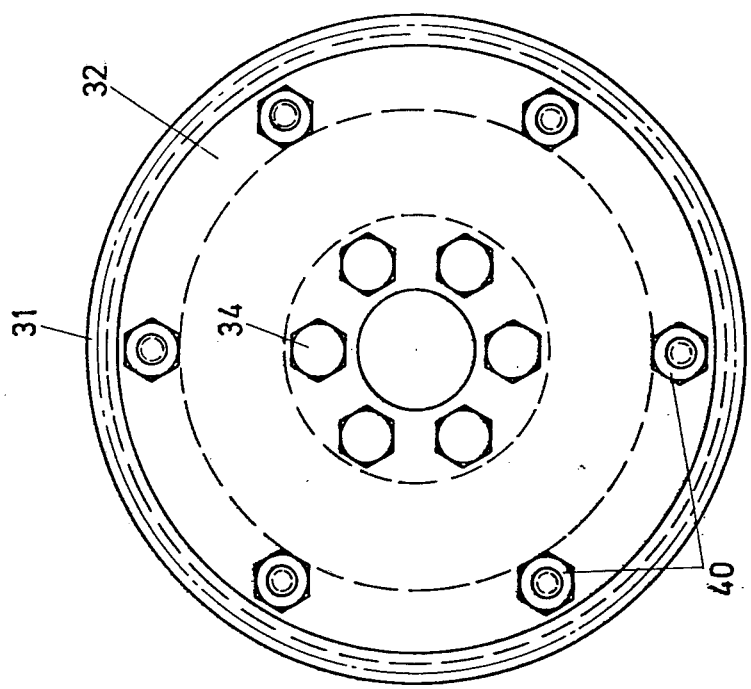
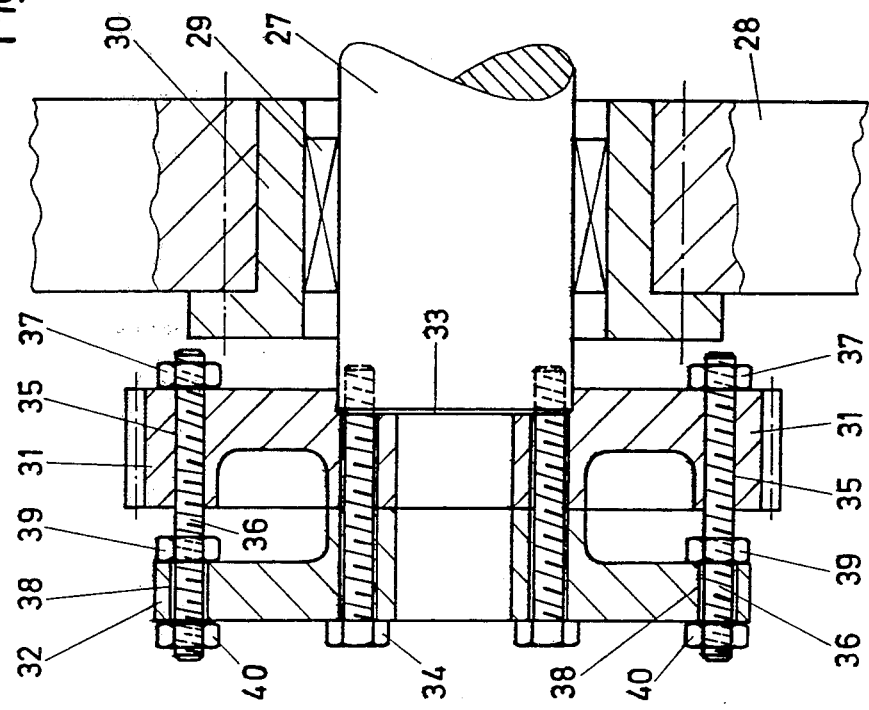

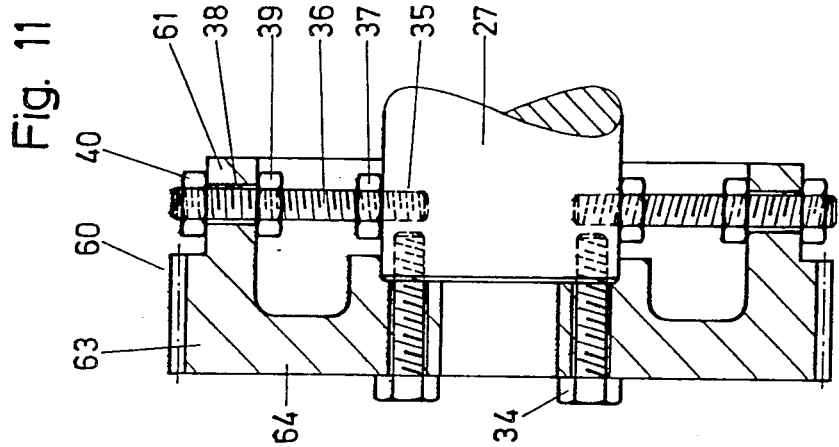
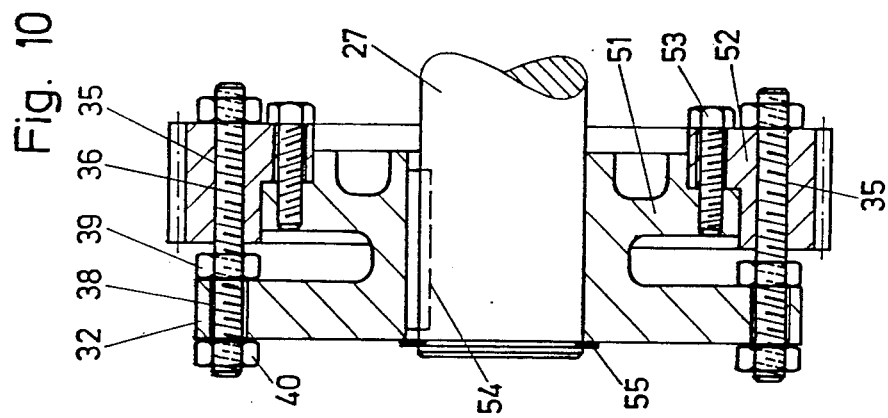
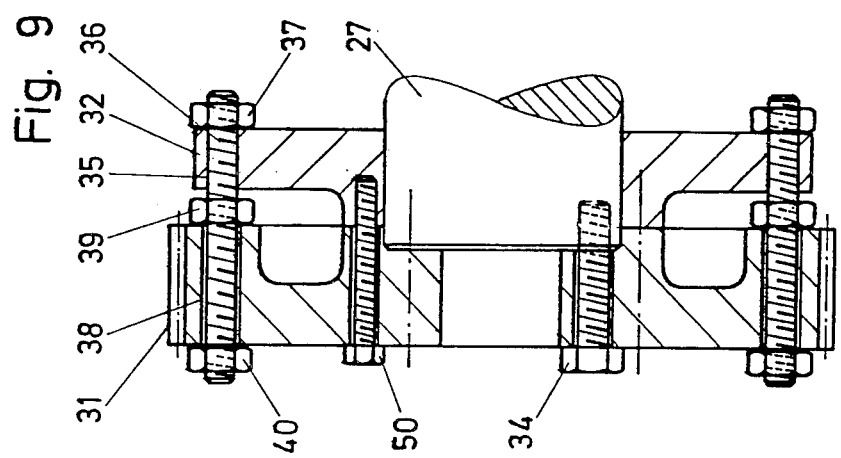

DEVICE FOR DRIVING OR SYNCHRONIZING CYLINDERS IN OFFSET PRINTING PRESSES

The invention relates to a device for driving or synchronizing cylinders in offset printing presses or machines.

In printing machines in general, and offset printing machines, in particular, there is a need to synchronize, to the greatest possible extent, the individual cylinders within a printing unit or the cylinders of different printing units in two or multi-color printing machines with respect to one another. If it is not possible completely to achieve this aim, mackling or ghosting i.e. displacement of the half-tone dots, occur in the printed product. In order to prevent these phenomena which considerably impair the quality of the printed product, demands are placed upon the synchronization of the individual cylinders which are difficult to meet even with the most advanced methods of production notwithstanding the fact that the quality of gear cutting attained is approaching that of master gears. Economic considerations therefore oppose any further increase in production accuracy.

The difficulties encountered are not only gearing defects or errors, such as total composite error i.e. both double and single flank, cumulative pitch error and tooth alignment error, but also the radial runout and axial runout of the driving gear when it is finally mounted on the cylinder journal. There is, therefore, little point in increasing even further the quality of gear cutting at such great expense as long as the slightest offset of the gearing with respect to the rotational axis of the cylinder or deformations in the gear body cannot be excluded or eliminated during assembly. Even if all the individual errors are in themselves yet within permissible tolerance range, the cumulative effect thereof can nevertheless cause a reduction in the quality of the printed product since the rotation of the cylinders is unsynchronized. Reference is accordingly made to rotational or turning errors or defects of the cylinders with respect to one another.

The detection and elimination of these rotational or turning errors is rendered difficult by the fact that some individual errors show themselves when the printing machine is turning over at low speed i.e. these errors are static in the effect thereof, whereas other errors only become noticable at high printing speeds i.e. these errors are dynamic in the effect thereof. A consequence of the last-mentioned case is that the irregularities impose upon the driving gears cause lifting off of the driving flanks.

Especially in the case of multi-color sheet-fed rotary offset printing machines with half-, one-third- or one-quarter-revolution cylinders e.g. sheet transfer drums or cylinders, turning or rotational errors have to be prevented due to the danger of mackling or ghosting. The reason for this lies in the fact that, for example, the radial runout of a double-diameter driving gear can impose a so-called two-step rhythm on a single-revolution cylinder. The first, third, fifth and so forth sheets printed by such a printing machine exhibit, for example, mackling or ghosting towards the front thereof, the second, fourth, sixth and so forth sheets printed exhibiting mackling towards the rear thereof. As a result, in the former case the half-tone dots of at least one of the colors of a multi-color print are displaced in the machine travel direction and, in the latter case, opposite to the machine travel direction. Even turning or rotational errors in the $\mu$ (micron) range are enough to detract noticeably from the quality of the printed product.

Efforts to improve the drive conditions by the use of elements for reducing backlash e.g. sprung follower gears, have not led to the desired result. It is not possible to eliminate play completely since even the radial runout—which although very small, is always there—results in residual tooth clearance or play.

It is accordingly an object of the invention to provide a device for driving or synchronizing cylinders in offset printing machines which avoids the foregoing difficulties and eliminates mackling resulting from yet permissible gearing deviations such as due to form, position and running of drive gears.

With the foregoing and other objects in view, there is provided, in accordance with the invention, a drive for cylinders of an offset printing machine having a gear train constructed of spur gears disposed as drive gears on respective shafts of the cylinders, and including clamping devices for synchronizing rotation of the cylinders, the clamping devices being rotatable with the spur gears respectively associated therewith and having respective gear rims deformable more or less in accordance with an adjustment thereof, comprising a clamping plate respectively disposed coaxially to the spur gears, the spur gears being helically toothed, and at least two of the clamping devices mounted on the clamping plates, respectively, and acting in radial direction upon the gear rim of the spur gear respectively associated therewith.

In accordance with another feature of the invention, the helically-toothed spur gear and the clamping plate are coaxially bolted in common to the drive end of the shaft journal of a respective cylinder, the spur gear being formed with threaded bores disposed symmetrically to the periphery thereof, threaded bolts threadedly secured in the threaded bores, the threaded bolts having respective free ends extending through a respective bore formed in the clamping plate, and an adjusting nut located on each of the threaded bolts at both sides of the clamping plate.

In accordance with a further feature of the invention, the shaft journal projects from a wall of the frame of the printing machine and the clamping plate is disposed on the shaft journal at a side of the helically-toothed spur gear facing toward the frame wall, the clamping plate being formed with threaded bores disposed symmetrically to the periphery thereof, threaded bolts threadedly secured in the threaded bores, the spur gear being formed with bores through which the threaded bolts, respectively, extend, and an adjusting nut respectively located on each threaded bolt at each lateral surface of the spur gear.

In accordance with a concomitant feature of the invention, the drive includes a slot and key connection formlockingly fastening the clamping plate to the drive side of the shaft journal, the clamping plate having a ring flange, a gear rim, bolts threadedly securing the gear rim to the ring flange, the gear rim being formed with threaded bores disposed symmetrically to the periphery thereof, the threaded bolts being threadedly secured in the threaded bores, the threaded bolts having respective free ends extending through a respective bore formed in the clamping plate, and an adjusting nut located at opposite sides of the clamping plate on each of the threaded bolts.

Other features which are considered as characteristic for the invention are set forth in the appended claims.

Although the invention is illustrated and described herein as embodied in a device for driving or synchronizing cylinders in offset printing presses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 6 and 7 are cross-sectional and front elevational views, respectively, of a drive gear with a clamping plate of the invention;

FIGS. 9 and 10 are views similar to that of FIG. 6 of differently modified embodiments of the invention for helical-toothed spur gears;

FIG. 11 is a view similar to those of FIGS. 9 and 10 of a further embodiment of the invention wherein a helical or straight-toothed drive gear is formed integral with the clamping plate;

Figure 13:
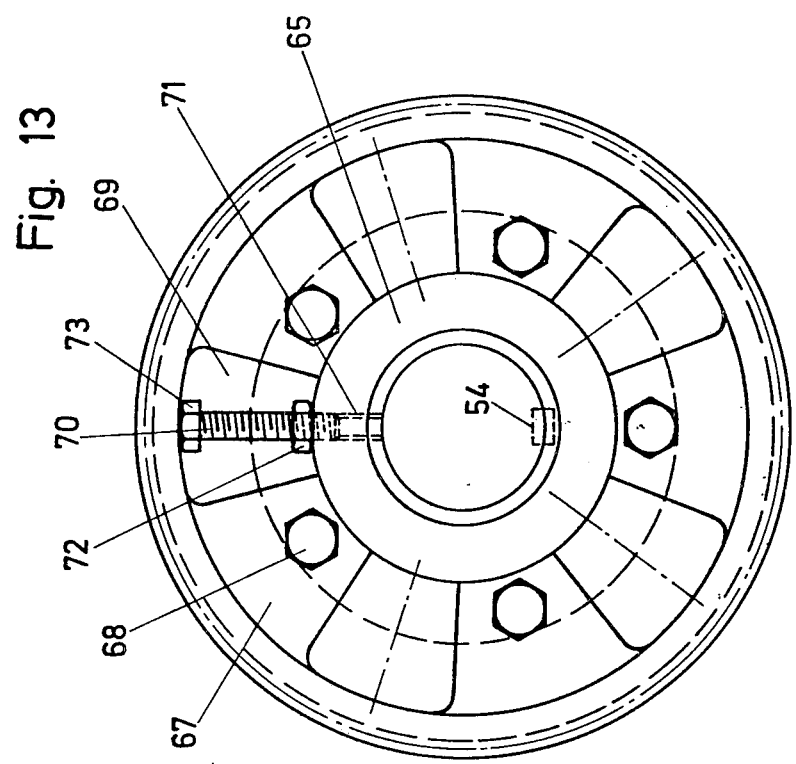
Figure 12:
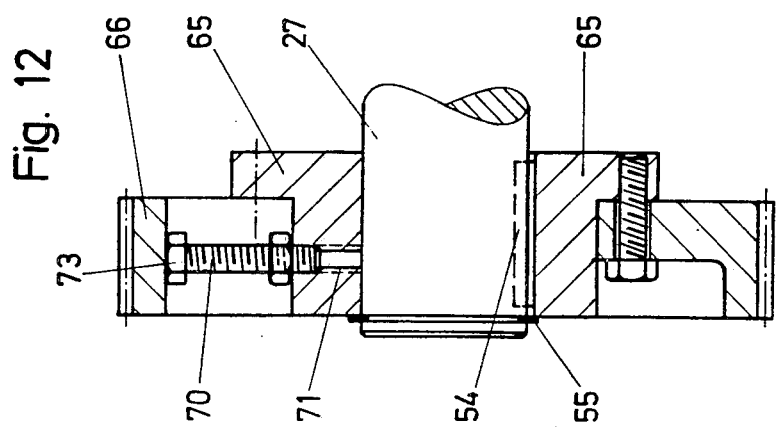
Figure 16:
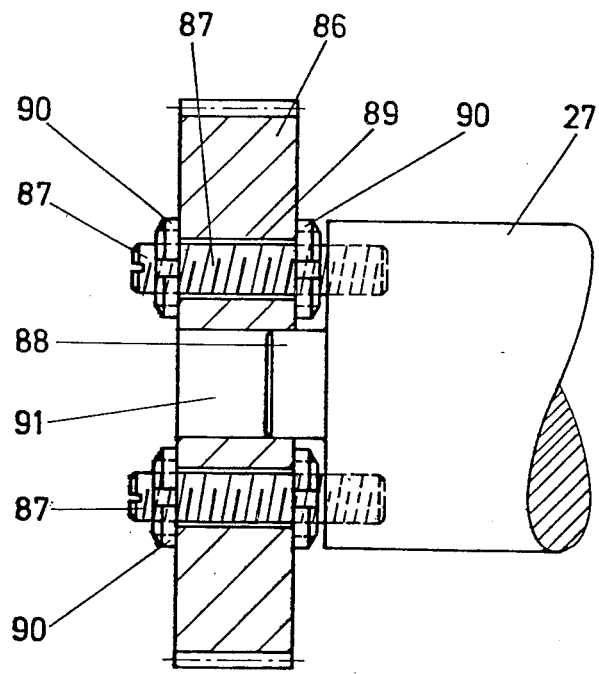

FIGS. 12 and 13 as well as 14 and 15, respectively, are views similar to those of FIGS. 6 and 7, respectively, of two additional different embodiments of the invention showing straight-toothed drive gears with clamping means provided in recesses formed in the gear body per se; and FIG. 16 is a view similar to that of FIG. 6 showing a helical-toothed spur adjustably mounted by means of support bolts on the end of a drive journal.

Like parts in each of the figures are identified by the same reference numerals.

Figure 1:
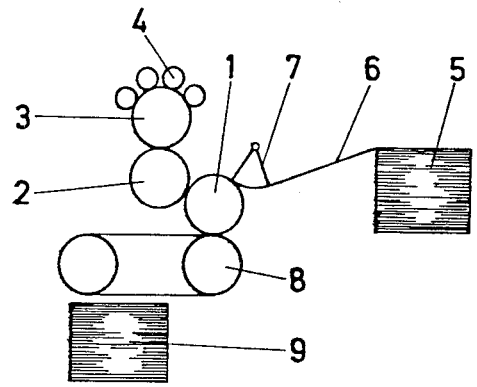
FIGS. 1 to 5 are diagrammatic views of offset printing press layouts wherein the device for driving or synchronizing cylinders according to the invention is used to advantage.

Referring now to the drawing and first, particularly, to FIG. 1 thereof, there is shown diagrammatically therein a single-color sheet-fed rotary offset printing machine having an impression cylinder 1, a blanket cylinder 2 and a plate cylinder 3 serially engaging one another, and an ink-dampening unit 4 for supplying ink to the plate cylinder 3. From a feed pile 5, sheets to be printed are fed over a feed table 6 and an advance gripper or pregripper 7 to the impression cylinder 1 and from there, after being printed, are delivered by a delivery system 8 to a delivery pile 9 on which they are deposited.

If the non-illustrated drive gear of the blanket cylinder 2 or the non-illustrated drive gear of the plate cylinder 3 in this machine of FIG. 1 were subject to a fault or defect, a shifting, for example, of the half-tone dots during printing would result. In order to eliminate such an error source, inventive measures must be taken either with respect to the drive gear of the blanket cylinder 2 or the drive gear of the plate cylinder 3.

Figure 2:
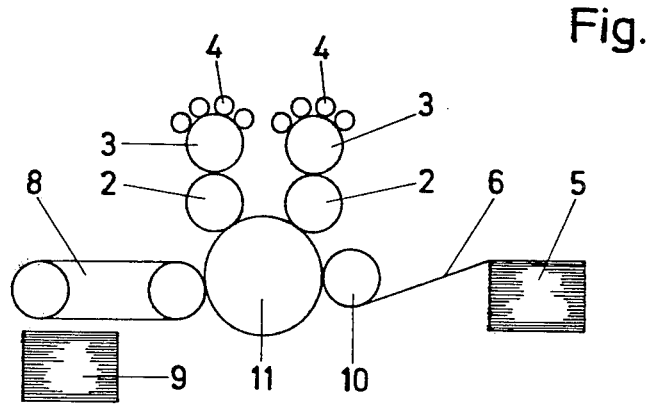

In FIG. 2, there is diagrammatically shown a two-color sheet-fed rotary offset printing machine having a feed pile 5 from which sheets are fed over a feed table 6 to a feed drum 10 and from the latter onto a double-diameter common impression cylinder 11 whereon the sheet is printed from a blanket cylinder 2 engaged by a plate cylinder 3 to which ink and dampening liquid are fed by an inking-dampening unit 4. After thus receiving a printing in one color, the sheet is printed with a second color by a second printing unit formed of another blanket cylinder 2, plate cylinder 3 and inking-dampening unit 4. The sheet which has then been printed in two colors is advanced to the delivery system 8 which delivers and deposits the sheet on the delivery pile 9.

Even the slightest rotational error or fault at the drive gear of the double-diameter impression cylinder 11 causes asynchronism. The consequences thereof are doubling or mackling phenomena in a so-called two-step rhythm i.e. the first, third, fifth, and so forth printed sheets exhibit mackling or doubling toward the front thereof, whereas the second, fourth, sixth, and so forth printed sheets have doubling or mackling toward the rear thereof. To eliminate these doubling or mackling phenomena, the source of the rotational fault or defect is removed by providing the device according to the invention on the drive gear of the double-size impression cylinder 11.

Figure 3:
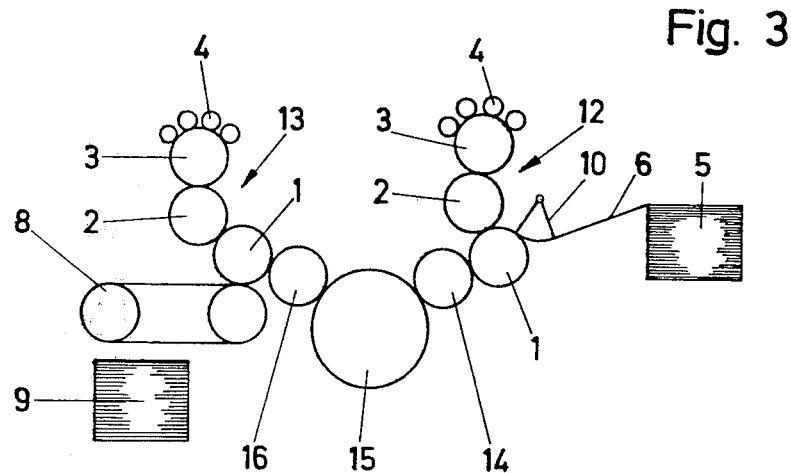

The two-color sheet-fed rotary printing machine according to FIG. 3 behaves in a similar manner to that of FIG. 2. Three sheet transfer cylinders 14, 15 and 16 are disposed between the two printing units 12 and 13. The middle sheet transfer cylinder 15 has double the diameter of the other cylinders 14 and 16. Each of the printing units 12 and 13 are again, respectively, made up of an impression cylinder 1, a blanket cylinder 2, a plate cylinder 3 and an inking-dampening unit 4. A sheet is fed from a feed pile 5 by means of a feed table 6 and a pregripper 10 to the impression cylinder 1 of the first printing unit 12 and, after the first printing operation has been performed, is transferred by means of the three sheet transfer cylinders 14, 15 and 16 to the impression cylinder 1 of the second printing unit. After the second printing operation has been performed thereon, the sheet is fed from a delivery unit 8 to a delivery pile 9.

If the drive gear of the double-size sheet transfer cylinder 15 has a defect or fault, this affects the drive gears of the cylinders of both printing units 12 and 13 so that, exactly as for the two-color sheet fed rotary offset printing machine according to FIG. 2, mackling or doubling occurs in two-step rhythm on the printed product. To eliminate this flaw, a clamping and adjusting device according to the invention must be provided on the drive gear of the double-size transfer cylinder 15.

Figure 4:
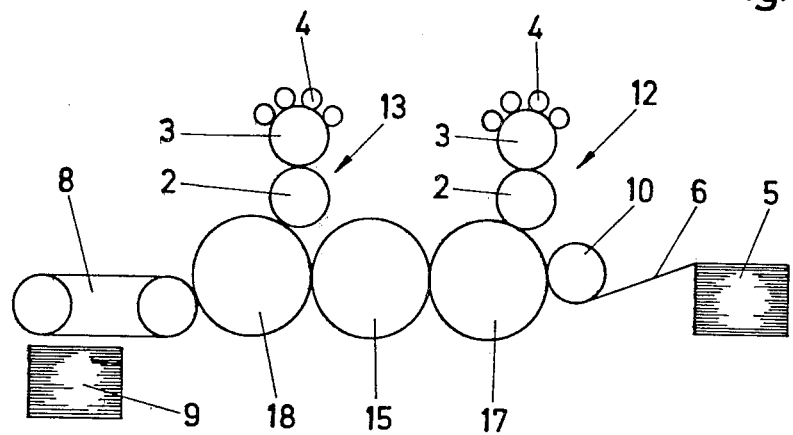

The embodiment of a two-color sheet-fed rotary offset printing machine according to FIG. 4 differs from that of FIG. 2 in that the impression cylinders 17 and 18 of both printing units 12 and 13 have a double-length diameter, and only one sheet transfer cylinder 15 having a double-length diameter is provided between the two printing units 12 and 13. The other parts of the embodiment of FIG. 4, namely the feed pile 5, the feed table 6, the feed drum 10, the blanket cylinders 2, the plate cylinders 3, the ink-dampening units 4, the delivery system 8 and the delivery pile 9 are identical with the corresponding components, both as to function and operation, in the hereinbefore-mentioned embodiments, of the invention.

If one of the drive gears of both double-diameter impression cylinders 17 and 18 or the drive gear of the double-diameter sheet transfer cylinder 15 should have a defect, then the drive gears of the printing units 12 and 13 are forced into asynchronous rotation which results in doubling or mackling in the aforementioned two step rhythm. In order to eliminate this defect, a clamping and adjusting device according to the invention must be provided on the defective drive gear of the three double-diameter cylinders 15, 17 and 18.

Figure 5:
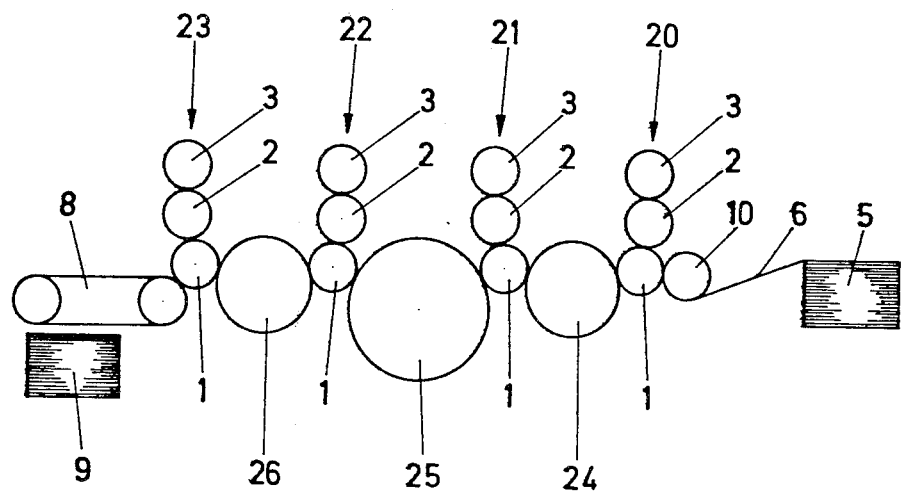

A device according to the invention is applicable especially advantageously to a four-color sheet-fed rotary offset printing machine, because the introduction of driving power into such a machine is more problematical than for two-color sheet-fed rotary offset printing machines, for which reason the four-color machines are more susceptible to rotation defects or faults. FIG. 5 shows a possible layout of the cylinders of such a four-color sheet-fed rotary offset printing machine in series or inline disposition. The four printing units 20, 21, 22 and 23 are, respectively, connected to each mutually adjacent printing unit thereof by a respective sheet transfer cylinder 24, 25 and 26. The middle sheet transfer cylinder 25, which mutually connects the printing units 21 and 22 has a triple-length diameter, whereas the other two sheet transfer cylinders 24 and 26 have only a double-length diameter. The reference-numeral identification of the other parts of the four-color sheet-fed rotary offset printing machine of FIG. 5 otherwise corresponds to that for like parts in the other embodiments shown in the preceding figures and described hereinbefore in this specification.

Faults or defects in the relatively large drive gears of the sheet transfer cylinders 24, 25 and 26, as noted hereinbefore, cause the cylinders 1 to 3 of the mutually adjacent printing units to rotate asynchronously which, in the case of the double-diameter sheet transfer cylinders 24 and 26, entails the two step rhythm of a double-printing or mackling phenomenon. Whereas the middle sheet transfer cylinder 25 with triple-length diameter causes a three-step rhythm i.e. three consecutive sheets exhibit different mackling or ghosting phenomena, wherein each individual mackling or ghosting phenomenon repeats for each third successive sheet. By the application of the clamping and adjusting devices according to the invention to the drive gears of the sheet transfer cylinders 24, 25 and 26, the double-printing, mackling or ghosting can be eliminated.

FIGS. 6 and 7 diagrammatically illustrate the application of a clamping device according to the invention. The drive and of a shaft journal 27 for a non-illustrated sheet-transfer cylinder is rotatably mounted in a roller bearing 29 in a side wall 28 of a printing machine, the roller bearing 29 being, carried by a bearing bushing 30 mounted on the side wall 28. A clamping plate 32 is centrically fastened, together with a helically-toothed spur gear 31, to the free end of the shaft journal 27 by clamping bolts 34 screwed into the end face 33 of the shaft journal 27. In the gear rim of the spur gear 31, threaded bores 35 are formed wherein threaded bolts 36 are screwed, which are secured against becoming unscrewed by lock nuts 37. The free end of the threaded bolts 36, respectively, extend through corresponding bores 38 formed in the clamping plate 32. At the side of the clamping plate 32 facing toward the spur gear 31, and at the opposite side of the clamping plate 32, respective adjusting nuts 39 and 40 are provided on each threaded bolt 36. By adjusting the adjusting nuts 39 and 40 on one or more of the threaded bolts 36, the helically toothed spur gear 31 is deformable in axial direction.

Figure 8:
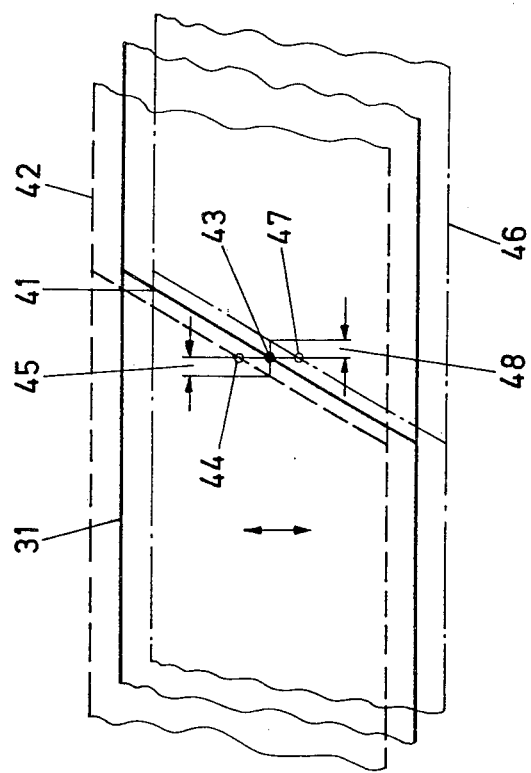
FIG. 8 is a diagrammatic representation of the deformation of a drive gear such as that of FIG. 6.

In FIG. 8, there is diagrammatically shown how a deformation of the spur gear 31 is effected in axial direction. A section of the spur gear 31 is diagrammatically illustrated in plan view in FIG. 8, only the leading flank line 41 of a tooth being illustrated, however. When the drive gear 31 is deformed into the position 42 thereof, shown in broken lines, an assumed point 43 thereon travels with the flank line 41 into the upper location 44 thereof, as shown in FIG. 8. The action or contact point 43 thus moves in peripheral direction over a distance 45 to the left-hand side of the figure.

On the other hand, if a force is exerted on the spur gear 31 so as to deform the latter into the position 46 thereof shown in phantom i.e. in dot-dash lines, in FIG. 8, then the assumed point 43 travels together with the flank line 41 into the lower position 47 thereof shown in the figure, which means that the action or contact point 43 is shifted in peripheral direction a distance 48 toward the right-hand side of the figure. The clamping and deformation causes a displacement in the order of hundredths of a millimeter. The peripheral displacement or shifting of the flank line 41 in peripheral direction is correspondingly small. This slight displacement or shift is sufficient, however, to eliminate an error or defect composed, for example, of a toothing or gearing and planar running or axial runout errors or defects.

A reversal of the disposition of the clamping device of FIG. 6 is shown in FIG. 9 wherein the clamping plate 32 is slipped onto the cylinder-shaft journal 27 with a sliding fit, and is firmly connected by bolts 50 to the helically-toothed spur gear 31. The spur gear 31 is again centrially or coaxially fastened by bolts 34 to the end face of the cylinder-shaft journal 27. The threaded bolts 36 are screwed into threaded bores 35 which are provided adjacent the periphery of the clamping plate 32 and distributed symmetrically thereto. A lock nut 37 secures each threaded bolt 36 again against becoming unscrewed.

A bore 38 for each threaded bolt 36 is located in the spur gear 31, the free end of the respective threaded bolt 36 extending through each of the bores 38. The adjusting nuts 39 and 40 are again provided on each of the threaded bolts 36 at both sides of the spur gear 31. By adjusting these adjusting nuts 39 and 40, it is possible, in the same manner as for the hereinaforedescribed embodiment, to exert a tensile or compressive force in axial direction on the gear body of the spur gear 31 so as to cause a deformation in corresponding direction.

The embodiment of the invention illustrated in FIG. 10 features the clamping plate 32 and a ring flange 51 which are integrally constituted for accomodating a helically-toothed gear rim 52. The gear rim is fastened by bolts 53 to the ring flange 51. The clamping plate 32 together with the ring flange 51 are firmly mounted on the free end of the cylinder-shaft journal 27 by a slot-and-key 54 connection and a locking ring 55.

The disposition of the threaded bolts 36 in FIG. 10 corresponds entirely and fully with that of the embodiment of FIG. 6 and, therefore, is believed to warrant no further explanation herein.

In the embodiment of the invention shown in FIG. 11, the spur gear 60 may be either helically or straight-toothed. The spur gear 60 is again coaxially or centrically connected firmly to the end face of the shaft journal 27 by bolts 34. The gear rim of the spur gear 60 changes or merges, at the inside thereof, into a clamping ring 61 which extends coaxially to the rotary axis of the shaft journal 27, and is thus integral with the spur gear 60.

Bores 38 are formed in the clamping ring 61 symmetrically to the periphery thereof, and extend radially outwardly and again through the threaded bolts 36. The lower end of the threaded bolts 36 is screwed into radially extending threaded bores 35 formed in the shaft journal 27. Lock nuts 37 prevent the unscrewing of the threaded bolts 36 from the threaded bores 35.

Both at the outer as well as the inner surface of the clamping ring 61, adjusting nuts 39 and 40 are provided by means of which a tensile or compressive force is able to be exerted upon the clamping ring 61. An adjustment of the adjusting nuts 39 and 40 causes the gear rim 63 of the spur gear 60 to be deformed either outwardly or inwardly about the web 64 and simultaneously in axial direction. This deformation would have the effect shown in FIG. 8 for helical toothing. A local outward or inward displacement or shift of the tooth flanks would result in a corresponding change in the pitch circle of the teeth, due to which, likewise, an asynchronous rotation of adjacent spur gears can be eliminated.

FIGS. 12 and 13 show a clamping device according to the invention for straight-toothed spur gears. A gear body 65 is firmly mounted by means of a slot-and-key connection 54 and a circlip or snap ring 55 on the shaft journal 27. A straight-toothed gear rim 66 has flanged webs 67 which are inwardly directed symmetrically to the periphery of the gear rim 66, and through which the gear rim 66 is firmly connected by bolts 68 to the gear body 65. In recesses 69 formed between the flange webs 67, respective adjusting bolts 70 are located which are screwed into radial threaded bores 71 formed in the gear body 65 and secured by lock nuts 72 against unintentional adjustment or shifting thereof. The adjusting bolts 70 have respective bolt heads 73 engaging the annular inner surface of the gear rim 66.

By adjusting one or more of these adjusting bolts 70, it is possible to deform the entire gear rim 66 in radial direction in such a manner as to compensate for out-of-round or noncircular rotation or toothing or gear faults or defects.

Figure 15:
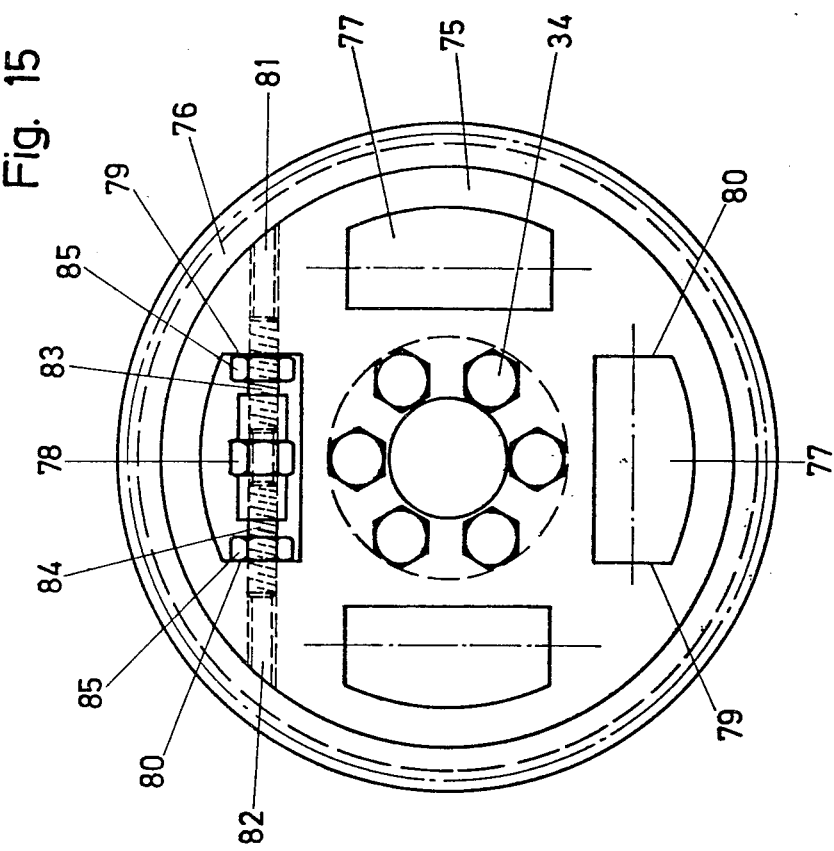
Figure 14:
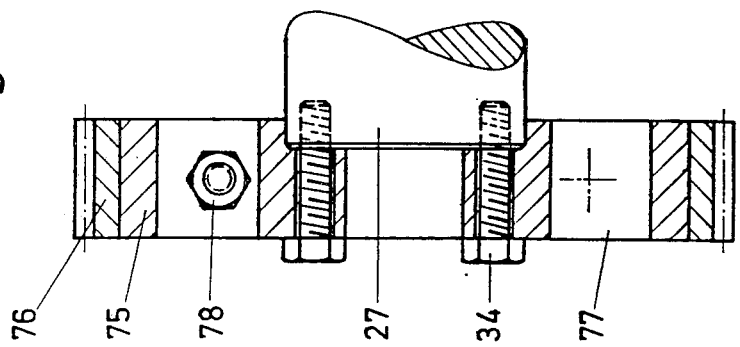

FIGS. 14 and 15 show a further clamping device embodiment provided for straight-toothed spur gears in accordance with the invention, by means of which rotational defects or faults can be eliminated.

A ring-shaped gear body 75 is fastened coaxially to the free end of the shaft journal 27 by bolts 34. A gear rim 76 is shrink-fitted onto the gear body 75. The gear body 75 is formed with four recesses 77 distributed symmetrically to the periphery of the gear rim 76 and having a respective turnbuckle 78 disposed therein.

Each turnbuckle 78 has at one end thereof a fine-threaded bore with a right-hand thread and at the other end thereof a fine-threaded bore with a left-hand thread. Threaded bores 81 and 82 are also machined in the side walls 79 and 80 defining the recesses 77, the bores 81 and 82 having threads which are opposite to one another. A threaded bolt 83 with a right-hand thread is screwed into the threaded bore 81, and a threaded bolt 84 with a left-hand thread into the opposite threaded bore 82. Lock nuts 85 secure both threaded bolts or pins 83 and 84 against becoming unscrewed. The turnbuckle 78 is screwed with the left-hand and right-hand threaded bores thereof onto the free ends of both threaded bolts 83 and 84. By adjusting the turnbuckle 78, either a tensile or a compressive force can be exerted upon the side walls 79 and 80 defining the recesses 77. Both the one or the other causes a deformation of the gear rim 76 in radial direction. In this manner, it is possible, with these turnbuckles 78, likewise to eliminate unsynchronized rotation of adjacent spur gears caused by gear faults or defects.

Finally, it is also possible to eliminate rotation errors or faults without deformation and merely by adjusting or shifting a spur gear. For this purpose, it is necessary, however, as shown in FIG. 16, that a spur gear 86 which is helically toothed be firmly connected by strong support bolts 87 to the shaft journal 27. Three, four or more of such support bolts 87 may be provided. They are screwed into threaded bores formed in the end faces of the shaft journal 27 and secured therein against turning.

The support bolts 87 extend with play or clearance through a respective bore 89 formed in the spur gear 86. A keyed-end nut 90 is provided, respectively, on each support bolt 87 on opposite sides of the spur gear 86. The spur gear is centered by a centering pin 88 of the shaft journal 27 which suitably projects or fits into a centering bore 91 formed in the spur gear 86.

If a defect or fault is found on the spur gear 86, the position of the spur gear 86 relative to the rotational axis of the shaft journal 27 can be varied by adjusting the nuts 90 of one or more of the support bolts 87. In this regard, displacement of the gear rim in axial direction is, for the most part, involved. Due to the helical toothing, such a displacement of the spur gear 86 effects a shift in the tooth flank line as is illustrated in FIG. 8.

If, thus, a spur gear is mounted on a shaft journal of a cylinder so as to be adjustable in axial direction, the possibility is likewise afforded thereby, when employing helically-toothed gearing, of eliminating rotational faults or defects merely by adjusting or shifting the bearings. Deformation of the gear rim is then unnecessary.

Instead of the tension and compression bolts employed in the various embodiments of the invention shown in FIGS. 1 to 16, other machine elements may be used such as eccentric bolts, wedges and the like.

There are claimed:

1. Drive for cylinders of an offset printing machine having a plurality of cylinders mounted on respective drive journal shafts and disposed in serial arrangement and a gear train formed of helically toothed, meshing spur gears respectively mounted on each of the journal shafts of the cylinders and having respective gear rims at the peripheries thereof, comprising a clamping plate disposed coaxially to at least one of the spur gears in fixed relationship thereto and spaced from at least a part thereof in axial direction of the one spur gear, a plurality of clamping devices mounted on said clamping plate, said clamping devices being engageable with the one spur gear and rotatable therewith, and means operatively connected with said clamping devices for adjusting said clamping devices in said axial direction so as to exert force in said axial direction upon the gear rim of the one spur gear for deforming the gear rim on the one spur gear, whereby rotation of the cylinder associated with the one spur gear is synchronized with that of the other cylinders of the printing machine.

2. Drive according to claim 1 wherin said helically-toothed one spur gear and said clamping plate are coaxially bolted in common to the drive end of the shaft journal of a respective cylinder with which said one spur gear is associated, the one spur gear being formed with threaded bores disposed symmetrically to the periphery thereof, the clamping devices comprising threaded bolts threadedly secured in said threaded bores, said threaded bolts having respective free ends extending through a respective bore formed in said clamping plate, and an adjusting nut located on each of said threaded bolts at both sides of said clamping plate.

3. Drive according to claim 1 wherein the shaft journal of a respective cylinder with which said one spur gear is associated projects from a wall of the frame of the printing machine and wherein said clamping plate is disposed on the shaft journal of said respective cylinder at a side of said helically-toothed one spur gear facing toward the frame wall, said clamping plate being formed with threaded bores disposed symmetrically to the periphery thereof, said clamping devices comprising threaded bolts threadedly secured in said threaded bores, said one spur gear being formed with bores through which said threaded bolts, respectively, extend, and an adjusting nut respectively located on each threaded bolt at each lateral surface of said one spur gear.

4. Drive according to claim 1 including a slot and key connection lockingly fastening said clamping plate to the drive side of the shaft journal of a respective cylinder with which said one spur gear is associated, said clamping plate having a ring flange, a gear rim, bolts threadedly securing said gear rim to said ring flange, said gear rim being formed with threaded bores disposed symmetrically to the periphery thereof, said clamping devices comprising threaded bolts being threadedly secured in said threaded bores, said threaded bolts having respective free ends extending through a respective bore formed in said clamping plate, and an adjusting nut located at opposite sides of said clamping plate on each of said threaded bolts.

* * * * *